United States Patent [19]

White et al.

[11] Patent Number: 5,766,534

[45] Date of Patent: Jun. 16, 1998

[54] PROCESS FOR PREPARING A RESIN MATRIX COMPOSITE USING A PREFORM

[75] Inventors: Warren D. White, Lake Jackson; James H. Barron, Lazy Oak Ranch, both of Tex.; Johnny P. Gendreau, Beacon Falls, Conn.

[73] Assignee: The Dow Chemical Company, Midland, Mich.

[21] Appl. No.: 702,193

[22] Filed: Aug. 23, 1996

Related U.S. Application Data

[63] Continuation of Ser. No. 330,899, Oct. 28, 1994, abandoned.

[51] Int. Cl.$^6$ .................. B29B 11/12; B29C 45/02
[52] U.S. Cl. .................. 264/258; 264/137; 264/328.4
[58] Field of Search .................. 156/245; 264/113, 264/137, 257, 258, 322, 324, 325, 328.4; 428/245

[56] References Cited

U.S. PATENT DOCUMENTS

| | | |
|---|---|---|
| 3,922,418 | 11/1975 | Lauchenauer . |
| 4,199,388 | 4/1980 | Tracy et al. .................. 264/137 |
| 4,213,930 | 7/1980 | Goodrich et al. . |
| 4,325,770 | 4/1982 | Korpman . |
| 4,329,387 | 5/1982 | Goodrich et al. . |
| 4,496,415 | 1/1985 | Sprengling . |
| 4,670,331 | 6/1987 | Radvan et al. .................. 264/324 |
| 4,992,228 | 2/1991 | Heck et al. . |
| 5,080,851 | 1/1992 | Flonc et al. . |
| 5,204,033 | 4/1993 | Pearce et al. .................. 264/137 |
| 5,217,766 | 6/1993 | Flonc et al. . |
| 5,281,388 | 1/1994 | Palmer et al. .................. 264/571 |
| 5,427,725 | 6/1995 | White et al. .................. 264/257 |
| 5,427,726 | 6/1995 | White et al. .................. 264/257 |

FOREIGN PATENT DOCUMENTS

| | | |
|---|---|---|
| 53-143665 | 12/1978 | Japan . |
| 56-163173 | 12/1981 | Japan . |
| 59-008374 | 2/1984 | Japan . |
| 2158471 | 11/1985 | United Kingdom . |

*Primary Examiner*—Richard Crispino

[57] ABSTRACT

A process for preparing a matrix resin composite contains the steps of: (1) preparing a preform containing multiple layer of reinforcing material and a crosslinkable tackifier by (a) applying the tackifier onto the reinforcing material, (b) compressing the layers of reinforcing material and partially crosslinking the tackifier under a pressure sufficient to compact the tackified, reinforcing layers to a volume which is less than their volume in the finished composite part and in a manner such that at least one surface of each of the reinforcing layers is or will be, during partially crosslinking, in direct contact with the tackifier, and (2) contacting the preform with a matrix resin.

7 Claims, No Drawings

5,766,534

PROCESS FOR PREPARING A RESIN MATRIX COMPOSITE USING A PREFORM

CROSS-REFERENCE TO RELATED APPLICATION

This is a continuation of application Ser. No. 08/330,899, filed Oct. 28, 1994, now abandoned.

BACKGROUND OF THE INVENTION

The present invention relates to a process for preparing resin matrix composites by resin transfer molding and to preforms useful in such processes.

One method for preparing a resin matrix composite of a continuous resin phase reinforced with fibers such as woven fabric, chopped fiber and the like, is known as resin transfer molding ("RTM"). In a conventional resin transfer molding process, layers of a reinforcing material are loaded into a mold, a thermosetting, matrix resin is injected into the mold and the resin cured to provide a finished composite. It is difficult and time consuming to load the layers of the reinforcing material into the mold. In addition, it was often necessary to stitch the reinforcing layers together in order to provide net-shaped preforms. By "net-shaped", it is meant that preform generally conforms to the final shape of the composite article.

In an improved resin transfer molding process, individual layers of a reinforcing material are sprinkled with a solid, tackifying powder which, when heated, will fuse onto the surface of the reinforcing material and then solidify upon cooling. The layers of the reinforcing materials with the tackifier can be stacked together, the tackifier heated, fusing the plies together under an appropriate pressure, and then cooled to form what has been called a net-shaped preform. This multilayered preform is placed into a mold, the matrix resin added, and the composite formed using ordinary resin transfer molding processes.

The tackifier used in known resin transfer molding may not be sufficiently soluble in the matrix resin to completely dissolve prior to curing it. As such, when the curable matrix resin is pumped into one end of the mold, it transports the undissolved tackifier to the other end of the mold. The resulting composite product contains a matrix resin whose chemical composition varies with location within the composite. Those areas having high concentrations of tackifier frequently have poorer physical or mechanical properties than the area containing lower proportions of tackifier. Moreover, extensive heating during the preforming process increases the molecular weight of the tackifier which causes a loss in adhesion between the tackifier and the reinforcing layers.

In addition, the tackified preforms are normally larger than the shape of the final composite because of the natural loft of the reinforcing fiber or fabric. In the preparation of the final resin matrix composite, the preforms are then compressed while the matrix resin is cured. Unfortunately, this often shifts or moves the preform or individual layers in the preform; thereby rendering the final composite part less uniform.

In view of the deficiencies of the prior art processes, it is desirable to provide an RTM process which provides greater uniformity in the final product.

SUMMARY OF THE INVENTION

In one aspect, the present invention is a process for preparing a matrix resin composite comprising the steps of:

(1) preparing a preform comprising a tackifier of a curable resin and two or more layers of a reinforcing material by:
  (a) applying the tackifier to at least one layer of reinforcing material,
  (b) compressing two or more layers of the reinforcing material and partially crosslinking the tackifier under a pressure above atmospheric pressure and sufficient to compact the reinforcing layers to a volume which is less than their volume in the finished matrix resin composite part and in a manner such that at least one surface of the reinforcing layers is or will be, during partially crosslinking, in direct contact with the tackifier, and (2) contacting the preform with a matrix resin which is a curable resin the same as or different than the tackifier under conditions such that the tackifier and matrix resins are cured, thereby forming the matrix resin composite.

In a preferred embodiment, the method for preparing the matrix resin composite comprises subjecting the layers of tackified, reinforced material to a temperature sufficient to partially crosslink the tackifier and at conditions such that at least one surface of each of the reinforcing layers is or will be, during partial crosslinking, in direct contact with the tackifier and to a pressure cycle of:

(i) a first pressure greater than atmospheric pressure,
  (ii) a second pressure which is substantially higher than the first pressure and sufficient to compact the preform to a volume which is less than their volume in the finished matrix resin composite part,
  (c) reducing the pressure to a third pressure which is lower than the second pressure while cooling the partially crosslinked, tackified, reinforcing material to a temperature sufficient to solidify the tackifier.

By the method of the present invention, final composite articles can be effectively prepared from preforms without crimping. These preforms, as well as the composites prepared therefrom, exhibit excellent uniformity.

In a second aspect, the present invention is a preform which comprises two or more layers of reinforcing material and a tackifier of a curable resin prepared by the described method.

The process and preforms of the present invention can be used to make reinforced matrix composites. The composites are useful as structural materials.

DETAILED DESCRIPTION OF THE PRESENT INVENTION

The preforms of the present invention are prepared from a tackifier and a reinforcing material. The preforms are then prepared into the resin matrix composites using a matrix resin which forms a continuous phase with the reinforcing material forming a discontinuous phase.

The reinforcing material can be essentially any fibrous material which reinforces the composite such as woven or non woven fibers, random fibers, monofilaments, chopped fiber and the like. They may be in the form of woven or non-woven fibrous materials, or in the form of random short fibers, and may be unidirectional or multidirectional. Materials which can be employed for reinforcing the matrix include quartz, aramid, boron, glass, carbon, polybenzazole, polybenzothiazole, and polyethylene. In general, the reinforcing material is preferably a quartz, aramid, boron, glass, carbon, or gel-spun polyethylene fiber. Preferably, the reinforcing material is in the form of woven fabrics, most preferably woven graphite fabric.

The tackifier is applied to the reinforcing material. The tackifier is preferably either: (1) a self-crosslinkable material (i.e., a material which is capable of at least partially crosslinking, optionally in the presence of crosslink initiators or promoters) with itself; or (2) a mixture of crosslinkable material and a crosslinking agent which is capable of at least partially curing the crosslinkable material.

Examples of suitable self-crosslinkable materials include polyimide, particularly bismaleimide; polycyanate ester; vinyl ester (with suitable initiators and promoters); and benzocyclobutene. The preferable self-crosslinkable material is a polyimide. The most preferred self-crosslinkable material is bismaleimide. An example of such a preferred self-crosslinkable material is 5250-4RTM BMI sold by BASF NARMCO.

Mixtures of crosslinkable material and crosslinking agent, i.e., crosslinkable systems, are preferably mixtures of a thermosetting resin and a curing agent, often referred to as a hardener. Representative examples of such systems include: (a) an epoxy resin (such as TACTIX® 123 epoxy resin or PR 500™ from 3M) and a curing agent which can cure an epoxy resin (such as MELAMINE™ 5260 curing agent); (b) a polyisocyanate and polyol which reacts with the isocyanate to form a polyurethane (such as SPECTRIM® MM310); and (c) an epoxy resin and cyanate ester resin (such as E-905L resin from BP Chemicals). When a crosslinkable system is employed, it is preferably an epoxy resin used in conjunction with a suitable curing agent and optionally a curing catalyst.

In the preferred system, the epoxy resin is preferably the glycidyl ether of a polyhydric phenol, such as biphenol, bisphenol A, tetrabromobisphenol A, a novolac resin or bis-(hydroxyphenyl)fluorene resin. It may be either a liquid or a solid epoxy resin and preferably has an epoxy equivalent weight (EEW) of between 150 and 700.

In the preferred system, the curing agent is preferably an amine, amide, sulfimide, sulfamide, polymercaptan, polyphenol, substituted imidazole, polyacid, polyanhydride, urea, thiourea or sulfonamide. It is more preferably an amine or amide compound, such as dicyanamide. In order to assist in partial curing it may be desirable to use a multistage curing agent, i.e., a curing agent which reacts with the epoxy resin to cure at different temperatures or at different rates at the same temperature. The multistage curing agent may be a single compound such as sulfanilamide or cyanoguanidine or a mixture of compounds that contain two or more reactive moieties that react with the epoxy resin to cure at different temperatures or at different rates at the same temperature.

The equivalent ratio of curing agent to epoxy resin is preferably between 0.5:1 and 1.5:1, and more preferably between 0.8:1 and 1.2:1, although a stoichiometric or 1:1 equivalent ratio is often most preferred.

Examples of suitable catalysts include primary aliphatic polyamines such as diethylenetriamine, triethylenetetramine and tetraethylenepentamine, tertiary amines such as triethyleneamine, tripropyleneamine and tributylamine, phosphonium salts such as ethyltriphenylphosphonium chloride, butyltriphenylphosphonium bromide, tetra-n-butylphosphonium acetate and ethyltriphenylphosphonium acetate, and substituted imidazoles such as 2-methylimidazole. Preferably, the catalyst is phosphonium salt such as tetra-n-butylphosphonium acetate and ethyltriphenylphosphonium acetate. If employed, the catalysts is preferably employed in a concentration of from about 0.01 to about 2 parts catalyst per 100 parts resin, by weight (phr), more preferably from about 0.05 to about 0.5 phr, and most preferably from about 0.08 and to about 0.2 phr.

In preparing the preform, the tackifier can be applied in any manner such that at least one surface of each of the reinforcing layers will be in contact with the tackifier during partially curing of the tackier. In general, the tackifier is applied to at least one side of each layer of the reinforcing material employed in preparing the preform in a manner and quantity sufficient to maintain net-shape, but small enough to leave the resulting preform porous to later allow the matrix resin to infuse throughout the reinforcing material. The tackifier is preferably employed in an amount of at least about 0.25, more preferably at least about 1, and most preferably at least about 3, weight percent of the reinforcing material. The tackifier is preferably used in an amount of no more than about 15, more preferably no more than about 8, and most preferably no more that about 5, weight percent of the reinforcing material.

The tackifier may be applied by known methods, such as spraying or dipping for liquid tackifiers, or sprinkling by hand, by using a flour sifter-type apparatus or by electrostatic application for tackifiers in the form of powders. It is preferably applied substantially evenly across the reinforcing material.

The layers of the reinforcing material are stacked and compressed together at a temperature sufficient to partially crosslink the tackifier after the tackifier is applied. For instance, the multiple layers of the reinforcing material can be compressed under a pressure above atmospheric pressure and sufficient to compress the tackified, reinforcing layers to a volume which is less than the volume of the finished resin matrix composite even after release of the compression pressure, and at a temperature sufficient to partially crosslink the tackifier. Typically, when the compression pressure is released, the preform expands or springs back and the compression pressure and temperature used in the practice of this invention is such to prevent the preform from expanding to a volume larger than its net-shape after release of compression. The compression pressure is preferably from about 10 psig (i.e., 25 psia) (70 kPa) to about 300 psig (2100 kPa), more preferably from about 20 psig (140 kPa) to about 200 psia (1400 kPa), most preferably from about 30 psig (210 kPa) to about 160 psig (1100 kPa).

The tackifier should be sufficiently crosslinked during compression to maintain the net-shape and to prevent substantial springback upon release of the compression pressure and the time and temperature used in preparing the preform are chosen such that the tackifier is partially crosslinked while the preform is formed. Partially crosslinking the tackifier prevents substantial migration of the tackifier while a matrix resin is injected.

To fuse or stick the tackifier to the reinforcing material, this preforming temperature is preferably higher than glass transition temperature of the tackifier. The glass transition temperature of the tackifier can be conveniently measured by differential scanning calorimetry ("DSC"). The preforming temperature most advantageously employed will vary depending on a variety of factors including the resin and curing agent selected, and the desired properties of the preforming step and resulting product and can readily be determined by persons of ordinary skill in the art. In general, the temperature at which preforming is conducted is from about 80° F. (27° C.) to about 400° F. (204° C.), more preferably from about 150° F. (66° C.) to about 350° F. (177° C.). The preforming step is preferably conducted in a time from about 5 to about 180 minutes, more preferably from about 10 to about 120 minutes, most preferably from about 30 to about 90 minutes.

The amount to which the tackifier is crosslinked (i.e., the degree of crosslinking) can be controlled by a variety of different methods. In one method, a resin composition that contains both resin and a curing agent may contain less than a stoichiometric amount of curing agent, so that only an incomplete cure is possible. The precise quantities of resin and curing agent can vary depending upon the resin and curing agent selected, but can readily be determined by persons of ordinary skill in the art. For instance, when the resin is a difunctional epoxy resin and the curing agent is a diamine, then the ratio of epoxy equivalents to amine equivalents is preferably between 0.5:1 and 0.85:1 or between 1.25:1 and 2:1.

In a second method, when resin composition contains both resin and a curing agent, the curing agent may be a multistage curing agent. In such case, the resin and curing agent can be cured at a first temperature and time that will only partially cure the resins and subsequently to a second, but different conditions, to complete cure.

Even when the tackifier is self-crosslinkable or contains stoichiometric ratios of resin and hardener, the time and temperature of the partial cure may be selected to provide the desired level of curing. Again, the optimal time and temperature will vary depending upon the tackifier and the presence or absence of any catalyst within the tackifier. For instance, when the tackifier contains bismaleimide, it is preferably reacted for between 5 and 120 minutes at a temperature between 120° C. and 150° C. to partially cure the bismaleimide in forming the net-shape preform.

Some partially cured tackifiers may continue to cure slowly at room temperature. Therefore, the preform is preferably prepared into a resin composite matrix before the tackifier has sufficiently cured to render the preform usable in preparing the resin matrix composite. The preform is preferably shelf-stable (i.e., will not render the preform unusable) for at least about two weeks, more preferably for at least about a month, and most preferably for at least about three months.

The pressure may be applied by any conventional means such as by a press, e.g., a hydraulic press, air press, air-oil press, mechanical press such as screw-driven press, and the like; a vacuum bag with or without a pressure vessel; weights and the like.

The means for imparting the compression pressure preferably comprises a heating device so that the tackifier/reinforcing material combination can be exposed to the desired temperature sufficient to partially cure the tackifier during the compression step. Examples of heating devices include an electric heater, steam lines, appropriate heat medium lines and the like which can be incorporated in a compression fixture, or surrounding the compression fixture such as environmental chamber, constant temperature oven, autoclave and the like. The press is preferably controlled such that the desired compression pressure and temperature can be applied. The press is preferably a hydraulic press with such a control system and a environmental chamber surrounding the compression fixture, a vacuum bag placed in pressured or unpressured autoclave or a combination of a hydraulic press and a vacuum bag.

In a preferred embodiment, the layers of reinforcing material are compressed together under a "pulse" cycle which comprises:

(i) a first pressure above atmospheric pressure,
(ii) a second pressure which is substantially higher than the first pressure and sufficient to compact the preform to a volume which is less than their volume in the finished matrix resin composite part,
(c) reducing the pressure to a third pressure which is lower than the second pressure while cooling the partially crosslinked, tackified, reinforcing material to a temperature sufficient to solidify the tackifier.

The first pressure is substantially lower than the second pressure. The first pressure is preferably from about 5 to about 50 (from about 35 to about 350), more preferably from about 10 to about 30 (from about 70 to about 210), most preferably from about 12 to about 16 (from about 80 to 110), psi (kPa). The first pressure is preferably applied until the temperature of the preform rises sufficiently high enough to fuse or stick the tackifier to the reinforcing material. This depends on the tackifier employed and desired temperature but is generally from about 1 to 60 minutes, preferably is 5 to 15 minutes.

The second pressure is higher than the first pressure and sufficient to compact the preform to a volume which is less than the volume of the desired molding. The pressure is preferably from about 25 to about 500 (from about 170 to about 3500), more preferably from about 40 to about 300 (from about 280 to about 2100), most preferably from about 50 to about 200 (from about 350 to about 1400), psi (kPa). During this period, the temperature is maintained at the preforming temperatures described hereinbefore. The preform is exposed to the second pressure for preferably about 1 to about 60 minutes, more preferably about 3 to 30 minutes, most preferably about 5 to about 10 minutes.

After applying the second pressure, the partially crosslinked, tackified, reinforcing material is cooled to a temperature sufficient to solidify the tackifier under the third pressure which is lower than the second pressure. The third pressure is preferably from about 5 to about 50 (from about 35 to about 350), more preferably from about 10 to about 30 (from about 70 to about 210), most preferably from about 12 to about 16 (from about 80 to 110), psia (kPa). The third pressure is preferably initially applied before the preform begins to cool, and preferably until the preform reaches sufficiently low temperature to solidify the tackifier. The preform is exposed to the third pressure for preferably more than 5 minutes, more preferably more than 15 minutes, most preferably more than 30 minutes, and preferably no more than 120 minutes, more preferably no more than 90 minutes, most preferably no more than 45 minutes. The third pressure may be same or different with the first pressure, but is preferably same as the first pressure. The temperature to solidify the tackifier is any temperature lower than a glass transition temperature of the tackifier and is preferably ambient temperature (e.g., about 20° to about 25° C.).

In this preferred embodiment, the pressure is applied by using a press with a control system or a combination of a press and a vacuum bag placed in pressured or unpressured environmental chamber. By applying this pressure, a temperature rising and cooling step can be conducted under lower pressure, and preform can be prepared without applying high pressure during entire process.

After its preparation, the preform is contacted with a matrix resin that contains a second curable resin which may or may not be the same or different than the tackifier. The matrix resin is preferably substantially the same as the tackifier, such that at least 50 percent of the backbone unit of the tackifier and the matrix resin are the same, more preferably at least 80 percent are the same, most preferably the tackifier and the matrix resin are made of the same material. The matrix resins should be completely cured without crosslinking agent, or with at least a stoichiometric quantity of curing agent.

The matrix resin is advantageously employed in an amount sufficient to hold the fibers together, to maintain fiber alignment and, preferably, to transfer loads around broken fibers. However, it is usually preferable to minimize the quantity of matrix resin in the composite. After curing, the matrix resin and tackifier usually make up at least about 25 volume percent of the composite and most often make up at least about 35 volume percent. The matrix resin and tackifier preferably make up no more than about 80, more preferably no more than about 50, and most preferably no more than about 40 volume percent of the composite.

The matrix resin is preferably applied under sufficient pressure to force it throughout the preform, so that the preform is impregnated with resin and voids (i.e., those areas without resin) within the cured composite are minimized. The matrix resin is preferably applied under a vacuum or at a pressure of up to 600 psia (3300 kPa), more preferably from 50 to 400 psia. There is frequently a pressure drop across the mold, so that pressure at the inlet may be as high as about 400 psia (2700 kPa) while pressure at the outlet is 50 psia (450 kPa) or lower.

The matrix resin and tackifier are then subjected to a temperature and other conditions suitable to fully cure them. The curing temperature and time most advantageous used will vary depending upon a variety of factors including the matrix resin and tackifier used, but generally the curing temperature is preferably from about 30° to about 350° C., and the curing time is preferably from about 15 to about 300 minutes. When the matrix resin and tackifier are epoxy resins such as glycidyl ether of a polyhydric phenol, a novolac resin or bis-(hydroxyphenyl)fluorene resin, then the final curing step is preferably conducted for a time from about 30 to about 120 minutes at a temperature from about 90° C. to about 180° C. However, for some epoxy resins the best curing temperature may be as high as 250° C. or more. When the matrix resin and tackifier are bismaleimide resins, then the final curing step is conducted for a time from about 60 to about 240 minutes at a temperature from about 150° C. to about 210° C., followed by a post-curing step of from about 60 to about 240 minutes at a temperature from about 175° C. to about 230° C. The final curing step is preferably completed in a mold that can provide a composite of the desired shape.

The resulting cured composite can be cooled, finished such as removing a flash and being applied a paint, and used in the ordinary manner for matrix composites.

The following examples are illustrative of the invention only and they should not be taken as limiting its scope. Unless otherwise stated all parts and percentages are by weight.

The following materials are used in the examples:

Epoxy Resin A—is brominated diglycidyl ether of bisphenol A having a viscosity of 170 cP to 210 cP at 150° C., an epoxy equivalent weight of 440 to 470 and is commercially available from The Dow Chemical Company as Quatlex® 6410.

Epoxy Resin B—is diglycidyl ether of bisphenol A having a melting point of 138° F. (59° C.) (by DSC), an epoxy equivalent weight of 675 to 750 and is commercially available from The Dow Chemical Company as D.E.R.® 662EH.

Epoxy Resin C—is a brominated diglycidyl ether of bisphenol A having an epoxy equivalent weight of 305 to 355, and is commercially available from The Dow Chemical Company as D.E.R.® 542.

Epoxy Resin D—is diglycidyl ether of bisphenol A having a viscosity of 9000 cP to 10500 cP at 25° C., an epoxy equivalent weight of 176 to 183 and is commercially available from The Dow Chemical Company as D.E.R.® 383.

Epoxy Resin E—is a fluorene-containing epoxy resin. It is crosslinkable resin without crosslinking agent. It is commercially available from 3M Corp. as AMD-0036.

Bis-A—is epoxy resin grade bisphenol A with an equivalent weight of 114.1 and is commercially available from The Dow Chemical Company.

TBBA—is tetrabromobisphenol A (2,2-bis-(3,5-dibromo-4-hydroxyphenyl)propane) with an equivalent weight of 271.9 and is available from Schenectady Chemicals, Inc.

BMI Resin—is a bismaleimide resin blend having a viscosity of 50 cps at 130° C., that is commercially available from BASF NARMCO as 5250-4RTM.

Catalyst A—is a 70 weight percent solution of ethyltriphenylphosphonium acetate:acetic acid complex and commercially available from Morton Thiokol.

Catalyst B—is the amide of sulfanillic acid (sulfanilamide) with a melting point of 165° C. to 167° C. and is commercially available from Aldrich Chemical.

EXAMPLE 1

Compaction Test Using Advanced BMI Resin
Synthesis of Advanced BMI Resin

BMI Resin (1000 grams) is weighed into a 2-liter resin kettle. The resin kettle is placed in a hot air circulation oven at 110° C. (230° F.) for approximately one hour in order to lower the viscosity of the resin. The kettle is heated using infrared lamps with stirring, according to the time and temperature set out in Table 1.

TABLE 1

| Time (min.) | Temperature (°C.) | Viscosity of Resin at 150° C. (cps) |
| --- | --- | --- |
| 01 | 78 | — |
| 10 | 99 | — |
| 20 | 125 | — |
| 30 | 140 | — |
| 40 | 140 | <10 |
| 50 | 140 | 30 |
| 60 | 140 | 50 |
| 70 | 140 | 78 |
| 100 | 140 | 242 |
| 120 | 141 | 546 |
| 140 | 139 | 1021 |
| 147 | 141 | 1621 |
| 151 | 140 | 2173 |

The preferred viscosity of the final cooled tackifier product is 2000 cps when tested at 150° C.

Compaction Test On Preforms With Advanced BMI
Resin Using MTS Testing Machine

A sixteen-ply preform is formed using the thus formed advanced BMI resin. A test sample is stamped out into a 1.128 inch diameter circular wafer from sixteen plies of 6K-4HS graphite woven fabric which is arranged so that fibers of the reinforcing material are running in four directions, 0, 90,±45 degrees and the wafer substantially has uniformity in all directions, i.e., quasi-isotropic configuration, using a steel rule die held in a 2.5 ton hydraulic press made by Carver laboratory. The advanced BMI resin powder is sprinkled on each ply in an even coat at a concentration of about 4.8 percent by weight. The nominal thickness of the test sample is 0.24 inches.

The sample is loaded into a physical testing machine made by Mechanical Test System (hereinafter MTS testing machine) with pressure control via hydraulic press which can maintain a constant pressure on the sample during contraction or expansion of the sample. The test fixture which contained the sample is placed in an environmental chamber. The temperature of the test sample is maintained at 200° F.±1° F. The weight load is adjusted to press the sample for 50 psig of pressure. The sample is heated for 10 minutes to bring it up to the desired temperature. The thickness of the sample is recorded, and the test started. At the end of the time period, the sample is cooled to 100° F. and the thickness is recorded again. The springback is calculated as the difference between the two thickness measurements. The result is shown in Table 2.

COMPARATIVE EXAMPLE A

The method of Example 1 is repeated except that the weight load is adjusted to 50 psig and immediately released. The springback is calculated with the results shown in Table 2.

EXAMPLE 2

Example 1 is repeated except that the temperature of the test sample is maintained at 300° F.±1° F. in the environmental chamber. Again, the springback is calculated with the results shown in Table 2.

COMPARATIVE EXAMPLE B

The method of Example 2 is repeated except that the test sample is maintained at 300° F.±1° F. in the environmental chamber. The springback is calculated with the results shown in Table 2.

TABLE 2

| Example No. | Compaction time (minute) | Compaction temperature (°F.) | Pressure (psig) | Thickness under pressure (inch) | Thickness without pressure (inch) | Springback (inch) |
|---|---|---|---|---|---|---|
| 1 | 60 | 200 | 50 | 0.127 | 0.138 | 0.011 |
| A | 0 | 200 | 50 | 0.125 | 0.145 | 0.020 |
| 2 | 60 | 300 | 50 | 0.126 | 0.133 | 0.007 |
| B | 0 | 300 | 50 | 0.126 | 0.139 | 0.013 |

These Examples show the use of a self-crosslinkable tackifier for making preforms. And these Comparative Examples show the preforms are not allowed to partially crosslink the tackifier under the pressure sufficient to compact the preforms to a volume which is less than the volume of net-shape. Comparing with Comparative Examples A and B, the preforms by Examples 1 and 2 show lower springback.

EXAMPLES 3–10

A sixteen-ply preform as prepared in Example 1 is loaded into a creep testing machine made by Advanced Test Systems Incorporation (hereinafter ATS creep testing machine) in which pressure supplied is via steel weight instead of hydraulic means. Some of the samples are subjected to a pulse pressure cycle of 10 minutes under pressure of 15 psig while heating to an elevated temperature as set forth in Table 3, 5 minutes under a pressure as recorded in Table 3 and about 30 minutes under 15 psig while being cooled to 100° F. Other samples are subjected to a single pressure for a period of 15 minutes under a full pressure as set forth in Table 3 while heating to the desired temperature, then cooling to 100° F. The springback for each sample is recorded and these results are recorded in Table 3.

TABLE 3

| Example | Type of Applied Pressure | Temperature (°F.) | Pressure (psig) | Thickness under full pressure (inch) | Thickness without pressure (inch) | Springback (inch) |
|---|---|---|---|---|---|---|
| 3 | Single | 180 | 115 | 0.110 | 0.137 | 0.027 |
| 4 | Pulse | 180 | 115 | 0.111 | 0.130 | 0.019 |
| 5 | Single | 180 | 155 | 0.105 | 0.131 | 0.026 |
| 6 | Pulse | 180 | 155 | 0.109 | 0.129 | 0.020 |
| 7 | Single | 200 | 115 | 0.109 | 0.130 | 0.021 |
| 8 | Pulse | 200 | 115 | 0.109 | 0.130 | 0.020 |
| 9 | Single | 200 | 155 | 0.110 | 0.132 | 0.022 |
| 10 | Pulse | 200 | 155 | 0.111 | 0.130 | 0.019 |

These examples show the use of a self-crosslinkable tackifier for making preforms using a compressing step. The preforms show low springback. In addition, preforms made using a pulse process show surprisingly better results, i.e., lower springback.

Moreover, the preforms by pulse process can be prepared without applying high pressure during the temperature rising and cooling steps. It may improve process capability by eliminating a use of means for applying high pressure such as a hydraulic press during entire process and using a means for applying only lower pressure such as a vacuum bag during the temperature rising and cooling step.

EXAMPLE 11

Compaction Test With Fluorene-Containing Epoxy Resin E

A preform is made as described in Example 1 except that the compression temperature is 250° F., the compression pressure is 45 psig and Epoxy Resin E is used as the tackifier. The results of the springback measurements are shown in Table 4.

COMPARATIVE EXAMPLE C

A preform is made as described in Comparative Example A except that the compression temperature is 250° F., the compression pressure is 45 psi and Epoxy Resin E is used as the tackifier. The results of the springback measurements are shown in Table 4.

TABLE 4

| Example No. | Compaction Time (minute) | Compaction temperature (°F.) | Pressure (psig) | Thickness under pressure (inch) | Thickness without pressure (inch) | Springback (inch) |
| --- | --- | --- | --- | --- | --- | --- |
| 11 | 60 | 250 | 45 | 0.123 | 0.135 | 0.012 |
| C | 0 | 250 | 45 | 0.111 | 0.132 | 0.015 |

This Example shows the use of a crosslinkable tackifier for making preforms, and this Comparative Example shows the preform is not allowed to partially crosslink the tackifier under the pressure sufficient to compact the preforms to a volume which is less than the volume of net-shape. Comparing with Comparative Example C, the preform by Example 11 shows lower springback.

EXAMPLE 12

A preform is fabricated from seven plies of 6K-4HS IM7 woven graphite fabric, arranged in a quasi-isotropic configuration. The dimensions of the preform are 12 inches by 30 inches. The woven fabric has a nominal thickness of 0.1 inches, and a net thickness of 0.058 inches is desired.

The test sample is placed in a steel mandrel, vacuum bagged to the surface and loaded into an autoclave. The autoclave is pressurized to 60 psig. The temperature is raised to 190° F. to 200° F. for 10 minutes, and maintained to ±5° F. via the autoclave heating system for 20 minutes. The preform is then cooled to 100° F. under the pressure about 30 minutes. The thickness of the preform without pressure is 0.058 inches.

EXAMPLE 13

A preform is formed as described in Example 13 except that the pressurization cycle is different in that the pressure of the autoclave is initially atmospheric pressure and a compression pressure to the preform is about 15 psig until the temperature is raised to 190° F. to 200° F. for about 10 minutes, and then the pressure of the autoclave is raised to 60 psig and the temperature is maintained at 190° F. to 200° F. for 20 minutes, afterward, the pressure of the autoclave is reduced to atmospheric pressure and the temperature of the autoclave is decreased to 100° F. for about 30 minutes. The thickness of the preform is 0.058 inches.

Example 12 and 13 show the use of curable tackifier with crosslinking agent. The preforms show low springback. Furthermore, the preform made by the pulse process in Example 13 has almost equivalent springback to that made in the single process shown in Example 12, although high pressure is applied for a shorter time. It may improve process capability by eliminating the use of means for applying high pressure such as a hydraulic press during entire process and using a means for applying only lower pressure such as a vacuum bag during the temperature rising and cooling step.

COMPARATIVE EXAMPLE D

Compaction Test On Preforms With An Advanced Epoxy Resin

Synthesis of an Advanced Epoxy Resin

An advanced bromine-containing epoxy resin is made. Epoxy Resin D (356 grams) and Bis-A (132 grams) are heated under nitrogen atmosphere from ambient temperature to 60° C. without stirring. At 60° C., the viscosity of the reaction mixture is low enough to allow heating from 60° C. to 80° C. with stirring. Catalyst A (0.62 grams, 1100 ppm) is added dropwise to the stirred reaction mixture. Over 45 minutes, the reaction temperature is increased from 80° C. to 150° C. An exotherm occurs around 150° C., and heating is reduced so that the reaction temperature does not exceed 200° C. Stirring is continued at about 190° C. for an additional 45 minutes. The hot reaction product is poured onto a cool, non-stick surface as a layer approximately ¼" thick (6.4 mm).

After the advanced resin cools and solidifies, it is broken into flake form. The flaked advanced epoxy resin is ground into a fine powder using a Bantam Mill (Mikro-Pul Corporation) fitted with a 0.013" (0.33 mm) herringbone slit screen. The grinding chamber is cooled to ambient temperature with liquid nitrogen to prevent melting of the resinous compound during the grinding.

A preform is made as described in Example 1 except the advanced epoxy resin is used as tackifier. The result is shown in Table 5.

COMPARATIVE EXAMPLE E

The method of Comparative Example D is repeated except that the weight load is adjusted to 50 psig and immediately released. The springback is calculated with the results shown in Table 5.

COMPARATIVE EXAMPLE F

Comparative Example D is repeated except that the temperature of the test sample is maintained at 300° F.±1° F. in the environmental chamber. Again, the springback is calculated with the results shown in Table 5.

COMPARATIVE EXAMPLE G

The method of Example E is repeated except that the test sample is maintained at 300° F.±1° F. in the environmental chamber. The springback is calculated with the results shown in Table 5.

TABLE 5

| Example No. | Compaction Time (minute) | Temperature (°F.) | Pressure (psi) | Thickness under full pressure (inch) | Thickness without pressure (inch) | Springback (inch) |
|---|---|---|---|---|---|---|
| D | 60 | 200 | 50 | 0.097 | 0.128 | 0.031 |
| E | 0 | 200 | 50 | 0.098 | 0.132 | 0.034 |
| F | 60 | 300 | 50 | 0.075 | 0.128 | 0.053 |
| G | 0 | 300 | 50 | 0.079 | 0.130 | 0.051 |

These Comparative Examples show the use of uncrosslinkable tackifier. The preforms show extremely high springback tendency comparing with the above described Examples using crosslinkable tackifier.

What is claimed is:

1. A resin transfer molding process for preparing a matrix resin composite, comprising the steps of:
   (1) preparing a preform comprising a tackifier of a curable resin and two or more layers of reinforcing material by:
      (a) applying the tackifier to at least one layer of the reinforcing material,
      (b) compressing the layers of reinforcing material (i) at a first pressure greater than atmospheric pressure and (ii) then at a second pressure which is substantially higher than the first pressure to compact the tackified, reinforcing layers to a volume which is less than their volume in the matrix resin composite while subjecting the layers of tackified, reinforced material, during compression, to a temperature sufficient to melt and partially crosslink the tackifier at conditions such that at least one surface of each of the reinforcing layers is or will be, during the partial crosslinking, in direct contact with the tackifier,
      (c) reducing the pressure to a third pressure which is lower than the second pressure while cooling the partially crosslinked, tackifier, reinforcing material to a temperature sufficient to solidify the tackifier; and
   (2) contacting the preform with a matrix resin which is a curable resin the same or different than the tackifier under conditions such that the tackifier and matrix resins are cured, thereby forming the matrix resin composite.

2. The process of claim 1, wherein the matrix resin and the tackifier resin are substantially the same.

3. The process of claim 1, wherein the tackifier comprises a bismaleimide resin.

4. The process of claim 1 wherein the tackifier comprises an epoxy resin and a suitable curing agent.

5. The process of claim 1 wherein the first pressure is from about 5 to about 50 psig, the second pressure is from about 25 to about 500 psig, and the third pressure is from about 5 to about 50 psig.

6. The process of claim 1 wherein the third pressure is initially applied before the preform begins to cool and is maintained until the preform reaches a sufficiently low temperature to solidify the tackifier.

7. The process of claim 1 wherein the preforming temperature is from about 27° to about 204° C.

* * * * *